(12) United States Patent
Xiao et al.

(10) Patent No.: US 11,988,839 B2
(45) Date of Patent: May 21, 2024

(54) AUGMENTED REALITY APPARATUS AND OPTICAL SYSTEM THEREFOR

(71) Applicant: MATRIXED REALITY TECHNOLOGY CO., LTD., Wuxi (CN)

(72) Inventors: Bing Xiao, Beijing (CN); Xiaobin Liang, Beijing (CN); Chi Xu, Beijing (CN)

(73) Assignee: MATRIXED REALITY TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/325,986

(22) Filed: May 30, 2023

(65) Prior Publication Data
US 2023/0296905 A1    Sep. 21, 2023

Related U.S. Application Data

(63) Continuation of application No. 16/930,061, filed on Jul. 15, 2020, now Pat. No. 11,693,244, which is a
(Continued)

(30) Foreign Application Priority Data

Feb. 12, 2018   (CN) .......................... 201810146738.7
Feb. 12, 2018   (CN) .......................... 201810146751.2
(Continued)

(51) Int. Cl.
*G02B 27/01*     (2006.01)
*G02B 1/11*      (2015.01)
(Continued)

(52) U.S. Cl.
CPC ....... *G02B 27/0172* (2013.01); *G02B 27/017* (2013.01); *G02B 1/11* (2013.01);
(Continued)

(58) Field of Classification Search
CPC .... G02B 27/0172; G02B 27/017; G02B 1/11; G02B 27/0101; G02B 27/0955;
(Continued)

(56) References Cited

U.S. PATENT DOCUMENTS 6,215,593 B1    4/2001  Bruce
7,733,572 B1    6/2010  Brown et al.
(Continued)

FOREIGN PATENT DOCUMENTS

CN    1664649 A    9/2005
CN    101201532 A   6/2008
(Continued)

OTHER PUBLICATIONS

The Third Office Action received in the corresponding Chinese Application 201810147326.5, dated Oct. 25, 2023.
(Continued)

*Primary Examiner* — Joseph P Martinez
*Assistant Examiner* — Grant A Gagnon

(57) ABSTRACT

The disclosure relates to an optical system for an augmented reality apparatus, comprising: an image projection source; and a polarizing beam splitter. The polarizing beam splitter has a beam splitting side adjacent to the image projection source and a transmission side facing away from the image projection source. The polarizing beam splitter is arranged such that light emitted from the image projection source is able to be non-perpendicularly incident on the beam splitting side and be at least partially reflected. The polarizing beam splitter is configured such that when light is incident on the beam splitting side, a polarized light component passes
(Continued)

through the polarizing beam splitter and is transmitted through the transmission side thereof, and a polarized light component is reflected from the beam splitting side. The optical system also comprises a polarizer disposed between the image projection source and the beam splitting side of the polarizing beam splitter.

20 Claims, 8 Drawing Sheets

Related U.S. Application Data continuation-in-part of application No. PCT/CN2019/074876, filed on Feb. 12, 2019.

(30) Foreign Application Priority Data

| Feb. 12, 2018 | (CN) | .......................... 201810146905.8 |
| Feb. 12, 2018 | (CN) | .......................... 201810146912.8 |
| Feb. 12, 2018 | (CN) | .......................... 201810146915.1 |
| Feb. 12, 2018 | (CN) | .......................... 201810147325.0 |
| Feb. 12, 2018 | (CN) | .......................... 201810147326.5 |
| Feb. 12, 2018 | (CN) | .......................... 201810147328.4 |
| Feb. 12, 2018 | (CN) | .......................... 201810147330.1 |
| Feb. 12, 2018 | (CN) | .......................... 201810147332.0 |
| Feb. 12, 2018 | (CN) | .......................... 201810147336.9 |

(51) Int. Cl.
  G02B 27/09     (2006.01)
  G02B 27/12     (2006.01)
  G02B 27/14     (2006.01)
  G02B 27/28     (2006.01)

(52) U.S. Cl.
  CPC .. *G02B 27/0101* (2013.01); *G02B 2027/0118* (2013.01); *G02B 2027/013* (2013.01); *G02B 2027/0178* (2013.01); *G02B 2027/0185* (2013.01); *G02B 27/0955* (2013.01); *G02B 27/123* (2013.01); *G02B 27/142* (2013.01); *G02B 27/145* (2013.01); *G02B 27/281* (2013.01); *G02B 27/283* (2013.01); *G02B 27/286* (2013.01)

(58) Field of Classification Search
  CPC .. G02B 27/123; G02B 27/142; G02B 27/145; G02B 27/281; G02B 27/283; G02B 27/286; G02B 2027/0118; G02B 2027/013; G02B 2027/0178; G02B 27/0185
  USPC ........................................................ 359/489
  See application file for complete search history.

(56) References Cited

U.S. PATENT DOCUMENTS

| 8,094,377 | B2 | 1/2012 | Kessler et al. |
| 9,971,150 | B1 | 5/2018 | Robbins |
| 10,422,995 | B2 | 9/2019 | Haddick |
| 11,226,489 | B2 | 1/2022 | Haddick |
| 2003/0169405 | A1 | 9/2003 | Agostinelli et al. |
| 2006/0131492 | A1 | 6/2006 | Kobayashi et al. |
| 2009/0109678 | A1 | 4/2009 | Hsu et al. |
| 2010/0290127 | A1 | 11/2010 | Kessler et al. |
| 2014/0240843 | A1 | 8/2014 | Kollin |
| 2015/0198807 | A1 | 7/2015 | Hirai |
| 2015/0301336 | A1 | 10/2015 | Denefle et al. |
| 2015/0378074 | A1 | 12/2015 | Kollin et al. |
| 2016/0131454 | A1 | 5/2016 | Jung et al. |
| 2016/0139411 | A1 | 5/2016 | Kang et al. |
| 2016/0320559 | A1 | 11/2016 | Richards |
| 2019/0025589 | A1 | 1/2019 | Haddick |
| 2019/0137764 | A1 | 5/2019 | Kang et al. |
| 2020/0103659 | A1 | 4/2020 | Ouderkirk et al. |
| 2020/0348522 | A1 | 11/2020 | Xiao et al. |

FOREIGN PATENT DOCUMENTS

| CN | 101418927 A | 4/2009 |
| CN | 101702045 A | 5/2010 |
| CN | 101881887 A | 11/2010 |
| CN | 201946235 U | 8/2011 |
| CN | 202008041 U | 10/2011 |
| CN | 102520478 A | 6/2012 |
| CN | 102540465 A | 7/2012 |
| CN | 202382166 U | 8/2012 |
| CN | 202433604 U | 9/2012 |
| CN | 103207426 A | 7/2013 |
| CN | 203277499 U | 11/2013 |
| CN | 103913806 A | 7/2014 |
| CN | 104956253 A | 9/2015 |
| CN | 105093556 A | 11/2015 |
| CN | 105892058 A | 8/2016 |
| CN | 205539729 U | 8/2016 |
| CN | 106019591 A | 10/2016 |
| CN | 106164746 A | 11/2016 |
| CN | 206563849 U | 10/2017 |
| CN | 107422480 A | 12/2017 |
| CN | 107422481 A | 12/2017 |
| CN | 107589546 A | 1/2018 |
| CN | 108181709 A | 6/2018 |
| CN | 108319018 A | 7/2018 |
| CN | 108319019 A | 7/2018 |
| EP | 1024388 A2 | 8/2000 |
| EP | 1267197 A2 | 12/2002 |
| GB | 1282425 A | 7/1972 |
| JP | H0659217 A | 3/1994 |
| JP | H08278476 A | 10/1996 |
| JP | H09304730 A | 11/1997 |
| JP | H10311963 A | 11/1998 |
| JP | H11153772 A | 6/1999 |
| JP | H11237584 A | 8/1999 |
| JP | H11308640 A | 11/1999 |
| JP | H11326818 A | 11/1999 |
| JP | 2002122806 A | 4/2002 |
| JP | 2002148559 A | 5/2002 |
| JP | 2005077840 A | 3/2005 |
| JP | 2007156096 A | 6/2007 |
| JP | 2008533517 A | 8/2008 |
| JP | 2010243751 A | 10/2010 |
| JP | 2012508392 A | 4/2012 |
| JP | 2017514168 A | 6/2017 |
| JP | 2017120311 A | 7/2017 |
| KR | 10-2008-0044040 A | 5/2008 |
| KR | 10-2014-0046365 A | 4/2014 |
| WO | 2012118573 A1 | 9/2012 |

OTHER PUBLICATIONS

The Extended European Search Report received in the corresponding European Application 19750619.9, dated Nov. 29, 2021.
Rudolf Kings Lake, "Lens Design Fundamentals", p. 336.
Richard D. Hudson, Jr., "Infrared System Engineering", p. 117.
Jun Xu et al., "Colorful Functional Film", published by Gansu Science & Technology Press in 2012, p. 180.
Notice of Rejection received in the corresponding Japanese Application 2020-565008, dated May 29, 2023.
Examination Communication received in EP Application No. 19751742.8; mailed Feb. 29, 2024.
Fourth OA received in CN Application No. 201810147326.5; mailed Mar. 15, 2024.

AUGMENTED REALITY APPARATUS AND OPTICAL SYSTEM THEREFOR

CROSS-REFERENCE TO RELATED PATENT APPLICATIONS

This patent application is a continuation of U.S. patent application Ser. No. 16/930,061, filed on Jul. 15, 2020 and titled "Augmented Reality Apparatus and Optical System Therefor", which is a continuation-in-part of International Application No. PCT/CN2019/074876, filed Feb. 12, 2019, which claims the benefit of and priority to Chinese patent application No. 201810146738.7 filed on Feb. 12, 2018; Chinese patent application No. 201810146751.2 filed on Feb. 12, 2018; Chinese patent application No. 201810146912.8 filed on Feb. 12, 2018; Chinese patent application No. 201810146905.8 filed on Feb. 12, 2018; Chinese patent application No. 201810147326.5 filed on Feb. 12, 2018; Chinese patent application No. 201810147336.9 filed on Feb. 12, 2018; Chinese patent application No. 201810147325.0 filed on Feb. 12, 2018; Chinese patent application No. 201810146915.1 filed on Feb. 12, 2018; Chinese patent application No. 201810147330.1 filed on Feb. 12, 2018; Chinese patent application No. 201810147332.0 filed on Feb. 12, 2018, and Chinese patent application No. 201810147328.4 filed on Feb. 12, 2018. The disclosures of the aforementioned applications are hereby incorporated by reference in their entireties for all purposes as set forth herein.

FIELD

The present application relates to an augmented reality apparatus, especially a head-mounted augmented reality apparatus. The present application also relates to an optical system for the augmented reality apparatus.

BACKGROUND

Augmented reality (AR) technology can be called as mixed display technology. Its principle is that an image projection source controllable by a computer is used to present an image, which is displayed for a user, to the eyes of the user, and the presented image is superposed with a real environmental image which can be directly seen by the eyes of the user so that real scene information augmented with the image presented via the computer is provided for the user. This kind of technology plays an increasingly important role in facilitating design and development of industrial products by designers. A head-mounted augmented reality (AR) apparatus is generally in the form of AR eyeglasses or a helmet.

According to the design of a conventional head-mounted augmented reality apparatus, the user who wears the AR eyeglasses or helmet may directly see light emitted from the image projection source due to light reflection at a structural component of the apparatus or caused by the user abnormally wearing the apparatus (for example the user wearing the AR eyeglasses or helmet askew). This will affect not only the image quality of required light in a human eye but also the final imaging's contrast, and also result in discomfort of the user who wears the augmented reality apparatus (because his/her eyes will be disturbed by a part of the light directly emitted from the image projection source).

Furthermore, in the design of the conventional head-mounted augmented reality apparatus, a part of the light emitted from the image projection source will finally exit from a semi-reflector side of the augmented reality apparatus. Another person, who would like to interact with the user of the augmented reality apparatus and stands opposite to him/her, can directly see the exiting out part of light so as to affect judgement through the expression in the user's eyes, which may make against the interaction between the two persons. Moreover, if an additional lens (such as a myopic lens) is arranged outside the augmented reality apparatus, the exiting part of light will be reflected at the lens so as to affect the final image quality.

SUMMARY

Concerning the issues mentioned above, the present application is aimed at proposing an optical system for an AR apparatus such that a user's eyes can be prevented from directly seeing an image projection source of the apparatus and light emitted from the image projection source will not exit from the apparatus to affect the interaction and improve the privacy of the apparatus's user.

According to an aspect of the present application, an optical system for an AR apparatus is provided, which optical system comprises:
an image projection source; and
a polarizing beam splitter having a beam splitting side adjacent to the image projection source and a transmission side facing away from the image projection source, the polarizing beam splitter being arranged such that light emitted from the image projection source is able to be non-perpendicularly incident on and be at least partially reflected by the beam splitting side, and the polarizing beam splitter being configured such that when light is incident on the beam splitting side, a polarized light component, whose polarization is in a first direction, passes through the polarizing beam splitter and is transmitted through the transmission side thereof, and a polarized light component, whose polarization is in a second direction perpendicular to the first direction, is reflected from the beam splitting side,
wherein the optical system also comprises a polarizer disposed between the image projection source and the beam splitting side of the polarizing beam splitter, and the polarizer is configured to allow polarized light, whose polarization is in the second direction, to be transmitted therethrough and polarized light, whose polarization is in the first direction to be absorbed.

Due to providing the polarizer, the possibility that the light emitted from the image projection source without being reflected by the polarizing beam splitter can be seen by the user's human eye can be reduced or eliminated such that the wearing comfort level of the user can be improved.

Optionally, the polarizer is integrated in the image projection source such that polarized light, whose polarization is in the second direction, is emitted from the image projection source. In this way, the volume of the optical system can be reduced such that the augmented reality apparatus can be more compact.

Optionally, the optical system also comprises a wave plate adjacent to the beam splitting side, the light emitted from the image projection source being able to be at least partially reflected by the beam splitting side towards the wave plate; and a semi-reflector located downstream of the wave plate in an optical path of reflected light, wherein the wave plate is preferably a quarter-wave plate. In this way, the light energy utilization of the optical system can be enhanced such that the augmented reality apparatus's power consumption can be reduced.

Optionally, the wave plate is a retarder film applied over a proximal surface of the semi-reflector. In this way, the volume of the optical system can be reduced such that the augmented reality apparatus can be more compact. Moreover, the number of reflective interfaces can be reduced, such that stray light for the whole optical system can be reduced and the contrast of the optical system can be enhanced.

Optionally, the polarizer is arranged in such a way that the optical path of reflected light is not affected. Therefore, the final image quality in the human eye will not be affected.

Optionally, the image projection source comprises an image source which is controlled to emit light, and a lens for focusing the emitting light, and wherein the polarizer is located between the image source and the lens.

Optionally, the image source, the polarizer and the lens are adhered together; or alternatively, the polarizer is adhered to one of the image source and the lens. Adhering together can ensure that the reflective interfaces between optical elements can be reduced such that light energy losing can be eliminated. Therefore, the effect of stray light can be alleviated or restrained so as to improve the image quality.

Optionally, the polarizer is a polarizing film.

Optionally, the image projection source comprises an image source which is controlled to emit light, and a lens for focusing the emitting light, and wherein the lens is located between the image source and the polarizer.

Optionally, the polarizer is a polarizing film applied over a surface of the lens.

Optionally, the image projection source also comprises a matching part located between the image source and the lens, and wherein the polarizer is located between the image source and the matching part or between the matching part and the lens.

Optionally, the image source, the matching part, the polarizer and the lens are adhered together; or alternatively, the polarizer is adhered to one of the image source, the matching part and the lens.

Optionally, the polarizer is a polarizing film.

Optionally, the image projection source also comprises a matching part located between the image source and the lens.

Optionally, the optical system also comprises an additional wave plate and an additional polarizer which are located in this order distal to the semi-reflector, wherein the additional wave plate is configured such that when circularly polarized light is incident on it, linearly-polarized light is able to exit therefrom, and the additional polarizer is configured to absorb the exiting linearly-polarized light, and wherein the additional wave plate is preferably a quarter-wave plate. In this way, the possibility that light the image source exits from a side of the augmented reality apparatus where the semi-reflector locates can be eliminated or alleviated. The privacy and interactivity of the user can be enhanced. In the meanwhile, the effects of stray light or "ghost", caused by light being emitted through the semi-reflector distally, then being partially reflected by a protective sheet, and finally entering the human eye, can be eliminated or alleviated.

Optionally, the additional wave plate and the additional polarizer are adhered together.

Optionally, the semi-reflector is a curved semi-reflector, and the contours of the additional wave plate and the additional polarizer in a lateral direction substantially follow the curved shape of the semi-reflector.

Optionally, the semi-reflector is a curved semi-reflector, and the contours of the additional wave plate and the additional polarizer in a longitudinal direction substantially perpendicular to the lateral direction substantially follow the curved shape of the semi-reflector.

Optionally, the semi-reflector is a curve semi-reflector, and the contours of the additional wave plate and the additional polarizer substantially follow the curved shape of the semi-reflector.

Optionally, the optical system also comprises a transparent protective sheet located distal to the additional polarizer, and wherein the transparent protective sheet is preferably a light attenuation sheet, a photochromic sheet or an electrochromic sheet. In this case, providing the additional wave plate and the additional polarizer can eliminate or alleviate the negative effects of stray light and "ghost" caused by light exiting from the semi-reflector, reflected by the transparent protective sheet, and finally entering the human eye.

Optionally, the additional wave plate is configured such that when the circularly polarized light is incident on it, a polarized light component, whose polarization is in the first direction, is able to exit therefrom, and wherein the additional polarizer is configured to absorb the polarized light component whose polarization is in the first direction.

Optionally, the additional wave plate is configured such that when the circularly polarized light is incident on it, a polarized light component, whose polarization is in the second direction, is able to be discharged out, and wherein the additional polarizer is configured to absorb the polarized light component whose polarization is in the second direction.

Optionally, the semi-reflector comprises a transparent substrate and a semi-reflective film applied over a surface of the substrate.

Optionally, the additional wave plate and/or the additional polarizer is an additional retarder film and/or an additional polarizing film integrated on the semi-reflector respectively, wherein the additional retarder film is preferably a quarter-retarder film. In this way, the volume of the optical system can be reduced such that the augmented apparatus can be more compact. Furthermore, the number of reflective interfaces can be reduced so as to eliminate the stray light of the optical system and improve the contrast of the optical system.

Optionally, the surface of the substrate is a proximal surface, and the additional retarder film is applied over a distal surface of the substrate and/or the additional polarizing film is applied over a distal surface of the additional retarder film.

Optionally, the surface of the substrate is a distal surface, and the additional retarder film is applied over a distal surface of the semi-reflective film and/or the additional polarizing film is applied over a distal surface of the additional retarder film.

According to another aspect of the present application, an optical system for an AR apparatus is provided, which optical system comprises:
  an image projection source;
  a polarizing beam splitter having a beam splitting side adjacent to the image projection source and a transmission side facing away from the image projection source;
  a first wave plate adjacent to the beam splitting side, the polarizing splitter being arranged such that light emitted from the image projection source is able to be non-perpendicularly incident on the beam splitting side and be at least partially reflected towards the first wave plate; and a semi-reflector located downstream of the first wave plate in an optical path of reflected light, the polarizing beam splitter being configured such that when the light emitted from the image projection source is incident on the beam splitting side, a polarized light component, whose polarization is in a first direction, passes through the polarizing beam splitter and is transmitted through the transmission side thereof, and a polarized light component, whose polarization is in a second direction perpendicular to the first direction, is reflected from the beam splitting side towards the first wave plate;

wherein the optical system also comprises:

a second wave plate and a polarizer which are located in this order distal to the semi-reflector, wherein the second wave plate is configured such that when circularly polarized light is incident on it, linearly-polarized light is able to exit therefrom, and the polarizer is configured to absorb the exiting linearly-polarized light, and wherein the first and/or second wave plate is preferably a quarter-wave plate. In this way, the possibility that the image light exits from the semi-reflector side of the augmented reality apparatus can be eliminated or alleviated. The privacy and interactivity of the user can be enhanced. In the meanwhile, the effects of stray light or "ghost", caused by light being emitted through the semi-reflector distally, then being partially reflected by a protective sheet, and finally entering the human eye, can be eliminated or alleviated.

Optionally, the second wave plate and the polarizer are adhered together.

Optionally, the semi-reflector is a curved semi-reflector, and the contours of the second wave plate and the polarizer in a lateral direction substantially follow the curved shape of the semi-reflector.

Optionally, the semi-reflector is a curved semi-reflector, and the contours of the second wave plate and the polarizer in a longitudinal direction generally perpendicular to the lateral direction substantially follow the curved shape of the semi-reflector.

Optionally, the semi-reflector is a curved semi-reflector, and the contours of the second wave plate and the polarizer substantially follow the curved shape of the semi-reflector.

Optionally, the optical system also comprises a transparent protective sheet located distal to the polarizer, and wherein the transparent protective sheet is preferably a light attenuation sheet, a photochromic sheet or an electrochromic sheet. In this case, providing the additional wave plate and the additional polarizer can eliminate or alleviate the negative effects of stray light and "ghost" caused by light exiting from the semi-reflector, reflected by the transparent protective sheet, and finally entering the human eye.

Optionally, the first wave plate is a first retarder film applied over a proximal surface of the semi-reflector.

Optionally, the second wave plate is configured such that when the circularly polarized light is incident on it, a polarized light component whose polarization is in the first direction exits, and the polarizer is configured to absorb the polarized light component whose polarization is in the first direction.

Optionally, the second wave plate is configured such that when the circularly polarized light is incident on it, a polarized light component whose polarization is in the second direction exits, and the polarizer is configured to absorb the polarized light component whose polarization is in the second direction.

Optionally, the semi-reflector comprises a transparent substrate and a semi-reflective film applied over a surface of the substrate.

Optionally, the second wave plate and/or the polarizer is a second retarder film and/or a polarizing film integrated on the semi-reflector.

Optionally, the surface of the substrate is a proximal surface, and wherein the second retarder film is applied over a distal surface of the substrate and/or the polarizing film is applied over a distal surface of the second retarder film.

Optionally, the surface of the substrate is a distal surface, and wherein the second retarder film is applied over a distal surface of the semi-reflector and/or the polarizing film is applied over a distal surface of the second retarder film.

According to another aspect of the present application, an augmented reality apparatus, especially a head-mounted augmented reality apparatus is provided, which apparatus comprises a bracket and an optical system as recited above and integrated in the bracket.

Optionally, the bracket is an eyeglasses frame.

According to the inventive technical means mentioned above, the possibility that the light emitted from the image projection source can be seen by the user's eyes without being reflected through the polarizing beam splitter can be reduced or eliminated, so as to improve the comfort level of the apparatus in use. Furthermore, the possibility that the light exits from the semi-reflector side of the augmented reality apparatus can be reduced or eliminated so as to improve the privacy of the user and enhance the interaction.

BRIEF DESCRIPTION OF THE DRAWINGS

The foregoing and other aspects of the present application can be well understood by the following detailed description in combination with the attached drawings. It should be noted that the drawings may be given in different scales for purpose of clarity, which however does not affect understanding to the present application. In the drawings.

DETAILED DESCRIPTION

Figure 1:
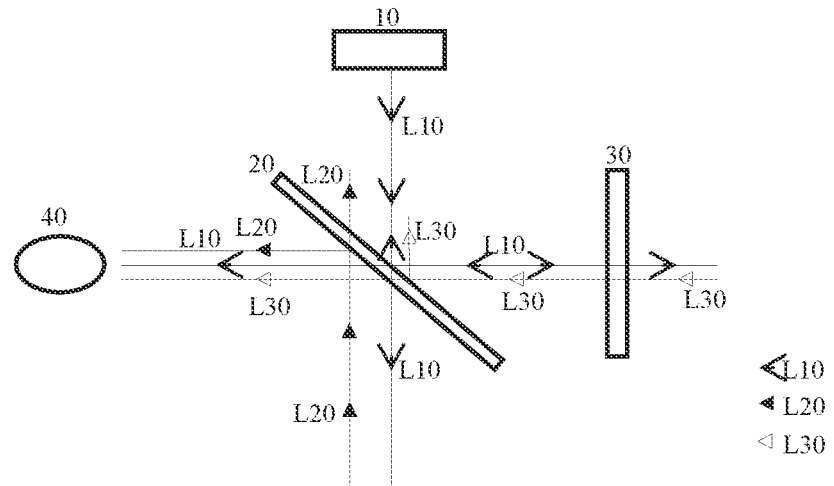
FIG. 1 is a view schematically illustrating an optical system for a conventional AR apparatus.

In the drawings of the present application, those features having the same configuration or similar function are represented by the same reference numerals. Further, it should be noted that for illustrative purposes only, light paths of optical systems shown by the drawings only show paths along which light propagates. However, this does not mean that those paths of light which are not shown do not exist in the light paths of the optical systems according to the present application.

FIG. 1 schematically illustrates an optical path diagram of an optical system for a conventional AR apparatus. The optical system of the conventional AR apparatus generally comprises an image projection source 10 controllable by a computer (not shown), a splitter 20 and a semi-reflector 30. Under control of the computer, the image projection source 10 can respectively emit light L10 to exhibit a desired image. Along the light L10 emitted from the image source, the splitter 20 is arranged downstream of the image projection source 10. One part of the light L10 emitted from the image source is reflected by the splitter 20, and the other part of the light emitted from the image source is transmitted through the splitter 20. Along an optical path of the reflected light of the light L10 emitted from the image source, the semi-reflector 30 is arranged downstream of the splitter 20. The reflected light of the light L10 emitted from the image source is partially transmitted outwards through the semi-reflector 30 and is partially reflected by the same semi-reflector, wherein the reflected part of the light partially passes through the splitter 20 again to be seen by a human eye. At the same time, ambient light L30 can respectively pass through the semi-reflector 30 and then partially through the splitter 20 to be seen by the human eye 40. Therefore, an image presented by a portion of the light L10 emitted from the image source and an environmental image presented by a portion of the ambient light L30 are superposed in the human eye 40 such that a user can experience an augmented reality effect for real scene. In the above conventional optical system, in order to ensure that the part of the light L10, emitted from the image source, being transmitted through the splitter 20 will not turn back to affect imaging, it is necessary to let that part of the light L10, emitted from the image source, unimpededly exit to the surrounding environment.

Figure 2:
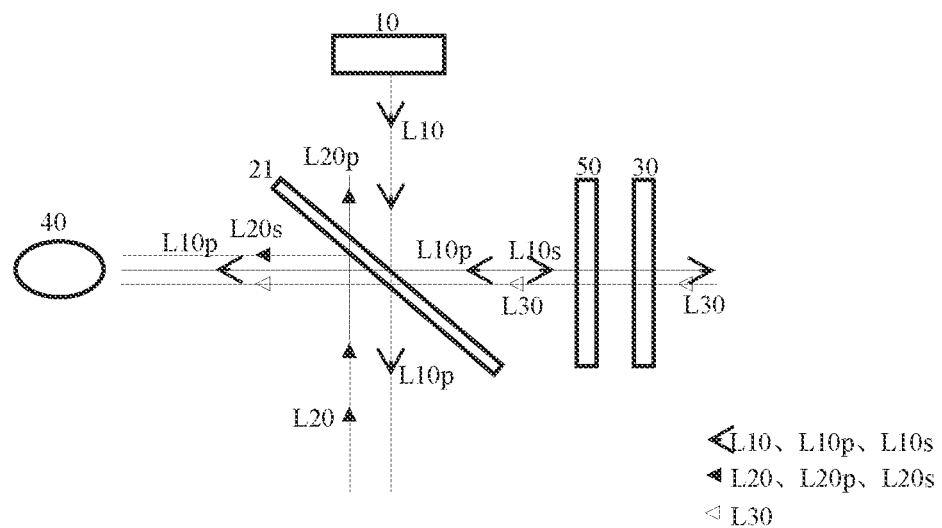
FIG. 2 is a view schematically illustrating an optical system for a modified AR apparatus.

In order to increase the energy utilization efficiency of the light L10 emitted from the image source, an optical system shown by FIG. 2 has been proposed for the AR apparatus. For clarity, only features of the optical system of the AR apparatus that are different than the optical system shown by FIG. 1 will be explained below. Regarding other constituting elements, one can refer to the already-explained contents. As shown by FIG. 2, the optical system of the AR apparatus comprises a polarizing beam splitter 21 in place of the splitter 20. For instance, the polarizing beam splitter can be made by applying a layer of a polarizing beam splitting film over a (non-polarizing) splitter substrate. The polarizing beam splitter 21 is arranged in such a way that its polarizing beam splitting film is adjacent to the image projection source 10. The splitter substrate can achieve the same function as the splitter 20 shown by FIG. 1. The polarizing beam splitting film is used to enable polarized light, whose polarization is in a first direction, to pass therethrough and polarized light, whose polarization is in a second direction perpendicular to the first direction, to be reflected thereby. For the purpose of clear description, the polarized light whose polarization is in the first direction and the polarized light whose polarization is in the second direction are respectively called, for example, as P-polarized light and S-polarized light below. Additionally, a quarter-wave plate 50 is arranged in an optical path between the polarizing beam splitter 21 and the semi-reflector 30. In an embodiment, the splitter substrate's diopter is 0~800°.

In the context of the specification, a beam splitting side of the splitter refers to a surface or interface, defined by a constituent part of the splitter, wherein light can be incident on the surface or interface and/or can be partially reflected and be partially transmitted therethrough; a transmission side of the splitter refers to a surface or interface, defined by a constituent part of the splitter, wherein light can be incident on the surface or interface and/or can be transmitted therethrough out of the splitter. In the embodiment shown by FIG. 2, the polarizing beam splitting film of the splitter 21 defines its beam splitting side and the splitter substrate defines the transmission side of the splitter. In the splitter 20 shown by FIG. 1, a surface of the splitter 20 adjacent to the image projection source 10 is the beam splitting side, and a surface of the splitter 20 facing away from the image projection source 10 is the transmission side.

Furthermore, it should be understood that in the context of the specification, the splitter (or its splitter substrate) can be cubic or planar. For instance, in a cubic beam splitter comprised of two right angled isosceles triangle prisms, a bevel of the prism constitutes a beam-splitting side of the splitter. For instance again, in a planar splitter, a planar surface of the splitter's planar substrate constitutes a beam splitting side of the splitter.

For the purpose of clear description, polarized light whose polarization is in a P-direction will be assumed as the polarized light whose polarization is in the first direction and polarized light whose polarization is in an S-direction will be assumed as the polarized light whose polarization is in the second direction respectively below. However, one ordinary person in the art shall understand that the P-polarized light and the S-polarized light can be rotated about a path, along which light propagates, under the premise of ensuring that their polarizing directions are perpendicular to each other. Therefore, the light polarized in the first direction can be polarized light whose polarization is at an angle relative to the P-direction, and the light polarized in the second direction can be polarized light whose polarization is at the same angle relative to the S-direction.

In the context of the specification, the term "film" or "plate" refers to a thin-layer structure which can be attached to another thin-layer structure in the form of a "film" or "plate", or refers to a single thin-layer structure.

In the context of the specification, a plane where the beam splitting side of the splitter assembly 22 locates is a plane where the beam splitting side substantially locates. The image projection source comprises a planar or curved image source capable of emitting light. In the context of the specification, the planar image source means that it has a substantially planar light-emitting side. Similarly, the curved image source means that it has a substantially curved light-emitting side. The image source can be made by an optical device such as an organic light-emitted diode (OLED), a liquid crystal on silicon (LCOS), a liquid crystal diode (LCD) or the like. A lens subassembly can comprise one or more lenses which are used to focus the light emitted from the image source so as to get clearer imaging. The plane where the beam splitting side of the splitter locates is at an angle β relative to the normal of the image projection source's image source. The angle β has a value of between 11° and 79°, preferably between 20° and 70°, more preferably between 30° and 60°, more preferably between 40° and 55°, most preferably between 40° and 50°. The plane where the beam splitting side of the splitter locates is at an angle α relative to an optical axis of the semi-reflector, wherein the angle α is between β−10° and β+10° and 0<α<90°. In this way, the maximum utilization efficiency of the light energy can be achieved. In the context of the present application, the term "between" relating to a range of value means that both end values of the range shall be considered as well. For instance, "a value A is between a value B and a value C" means that the value A can be the value B, the value C or a value which is greater than the value A but less than the value C.

The semi-reflector 30 comprises a transparent substrate and a semi-reflective film applied over a surface of the transparent substrate. The semi-reflective film is used to enable light incident on it to be partially reflected and partially transmitted through the same. Furthermore, it should be understood by the ordinary person in the art that the term "semi-reflector" or "semi-reflective film" does not mean that half the energy of light incident on it is reflected by the same and half the energy of the light is transmitted through the same. Rather, the ratio between the reflected light energy and the transmitted light energy can for instance depend on the characteristics of the "semi-reflector" or "semi-reflective film" itself.

In an embodiment, the substrate of semi-reflector has a diopter of 0~800°.

In a preferred embodiment, the substrate of the semi-reflector itself is an optical lens for refractive correction, for instance an optical lens used for correcting refractive errors.

Furthermore, in the context of the present application, a distal side or surface of one optical element (for example the semi-reflector) refers to a side or surface of the same optical element facing away from the human eye along a straight optical path of light entering the human eye; correspondingly, a proximal side of surface of the one optical element refers to a side or surface of the same optical element adjacent to the human eye along the straight optical path of light entering the human eye.

Further as shown by FIG. 2, when light L10 emitted from the image projection source 10 passes through the polarizing beam splitter 21, a P-polarized light component L10p of the light L10 emitted from the image source is transmitted through the splitter and a S-polarized light component L10s of the light L10 emitted from the image source is reflected towards the semi-reflector 30 or the quarter-wave plate 50.

When passing through the quarter-wave plate 50, the S-polarized light component L10s is converted into circularly polarized light (or elliptically polarized light). Then, the circularly polarized light (or the elliptically polarized light) is partially reflected by and partially transmitted through the semi-reflector 30. When passing through the quarter-wave plate 50 again, the reflected circularly polarized light (or the reflected elliptically polarized light) is converted into a P-polarized light component L10p. Subsequently, this P-polarized light component L10p passes through the polarizing beam splitter 21 to be seen by the human eye 40. In the meanwhile, ambient light L30 also sequentially passes through the semi-reflector 30 and the quarter-wave plate 50 and then partially through the splitter 21 to be seen by the human eye 40. Furthermore, when being incident on the polarizing beam splitter 21, unwanted light L20 is converted into a P-polarized light component L20p transmitted through the splitter and a S-polarized light component L20s reflected by the splitter, wherein only the S-polarized light component L20s can be seen by the human eye 40.

In the optical system shown by FIG. 1, the light energy of the light L10 emitted from the image source, when being incident on the splitter 20, loses half; then, the light energy of the light, when being incident on the semi-reflector 30, loses half; then, the light energy of the light, when being returned back and being incident on the splitter 20 again, loses half. That is to say, only one eighth of the light energy of the initial light L10 emitted from the image source can be used for imaging in the human eye 40. In contrast, in the optical system shown by FIG. 2, the light energy of the light L10 emitted from the image source, when being incident on the splitter 21, loses half; then, the light energy of the light, after being incident on the semi-reflector 30, loses half; however, the light energy of the light, when being returned back and being incident on the splitter 20 again, will not lose any. That is to say, a quarter of the light energy of the initial light L10 emitted from the image source is used for imaging in the human eye 40, which substantially improves imaging brightness and contrast and thus reduces the apparatus's power consumption.

It can be seen from FIGS. 1 and 2 that the light L10 or the light component L10s emitted from the image projection source 10 and transmitted directly through the splitter 20 or 21 can be seen by the user who does not wear the head-mounted AR apparatus in place, so as to affect the wearing comfort and the contrast of imaging. Furthermore, because the performances of the optical elements are not ideal, there must be a part of the light or the light component being reflected at the splitter 20 or 21 towards the human eye, which will affect the final image quality. Furthermore, it can be seen from FIGS. 1 and 2 that a part of the light L10 emitted from the image projection source 10 is reflected outwards through the semi-reflector 30, such that one person aside the user can see the image projection source 10, resulting in poor privacy of the AR apparatus. Furthermore, since light may partly emit outwards, the person aside the user cannot make eye contact with him/her, resulting in poor interactivity. Moreover, if the user wears other lenses such as shortsighted lenses in addition to the AR apparatus, the outwards emitting light part may be reflected at the other lenses, which will further affect the image quality in the human eye.

Figure 3:
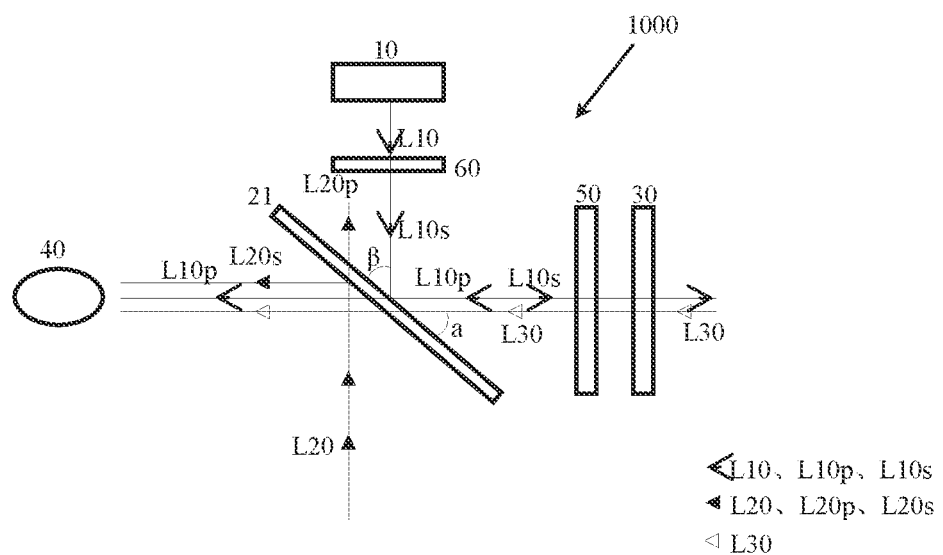
FIG. 3 is a view schematically illustrating an optical system for an AR apparatus according to an embodiment of the present application.

FIG. 3 schematically illustrates an optical system 1000 according to an embodiment of the present application. The optical system 1000 generally comprises an image projection source 10 controllable by a computer (not shown), a polarizing beam splitter 21 and a semi-reflector 30, wherein a quarter-wave plate 50 is arranged in an optical path between the polarizing beam splitter 21 and the semi-reflector 30. Settings of the image projection source 10, the polarizing beam splitter 21, the semi-reflector 30 and the quarter-wave plate 50 can refer to the previously described contents. Additionally, in the optical system 1000, viewed in an optical path of light L10 emitted from the image projection source 10, a polarizer 60 is arranged upstream of a beam splitting side of the polarizing beam splitter 21. The polarizer 60 is an optical element allowing light polarized in the second direction to be transmitted therethrough and light polarized in the first direction to be absorbed thereby. That is, in the embodiment illustrated by FIG. 3, the light L10 from the image projection source 10, when passing through the polarizer 60, is converted into an S-polarized light component L10s. This S-polarized light component L10s will be incident on the polarizing beam splitter 21 and is reflected by its beam splitting side towards the quarter-wave plate 50. Therefore, no other polarized light component can exit from a transmission side of the polarizing beam splitter 21. In this way, the possibility that the human eye 40 sees the image projection source 10 directly through the polarizing beam splitter 21 can be eliminated or reduced. One ordinary person in the art shall understand that the polarizer 60 shall be arranged in such way that the optical path between the polarizing beam splitter 21 and the quarter-wave plate 50 is not affected.

According to the embodiment of the present application, the polarizer 60 is disposed between the image projection source 10 and the polarizing beam splitter 21 as mentioned above. Alternatively, the polarizer can be integrated in the image projection source 10 such that the light emitted from the image projection source 10 is S-polarized light.

Figure 4A:
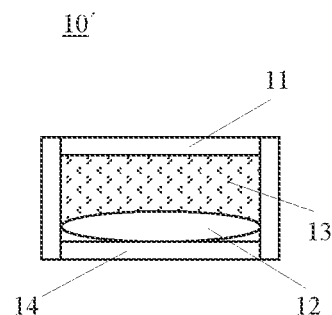
FIG. 4a schematically illustrates an image projection source according to an embodiment of the present application.

FIG. 4a schematically illustrates an image projection source 10' according to an embodiment of the present application. The image projection source 10' comprises an image source 11, a matching part 13 and a lens 12. The image source 11 is used to display an image that will be projected into the human eye, under control of the computer. For example, the image source can be a planar image source, comprising but not being limited to display devices such as OLED, LCOS, LCD or the like. The lens 12 can be a single lens or a lens subassembly comprised of lenses, for focusing light to enhance the imaging's sharpness. The matching part 13 is located between the image source 11 and the lens 12 and is made of a high transmittance material whose refractive index is greater than air, such that stray light can be restrained or reduced and the "ghost" effect can be reduced. In the embodiment shown by FIG. 4a, the material of the matching part 13 is a liquid. Therefore, a sealing frame is surrounded between the lens 12 and the image source 11 to enclose the matching part 13 therein. Alternatively, the matching part 13 can be solid and adhered together with the lens 12 and the image source 11 directly by an adhesive.

Further as shown by FIG. 4a, in an optical path of light emitted from the image source 11, the image projection source 10' also comprises a polarizer 14 arranged downstream of the lens 12. Similar to the polarizer 60, the polarizer 14 is an optical element allowing light polarized in the second direction to be transmitted therethrough and light polarized in the first direction to be absorbed thereby. Therefore, under the action of the polarizer 14, light emitted from the image projection source 10' is light polarized in the second direction. It should be understood by the ordinary person in the art that the polarizer 14 can be a polarizing film applied over a surface of the lens 12.

It should be understood by the ordinary person in the art that in an alternative embodiment, the polarizer 14 can be provided between the image source 11 and the matching part 13 or between the matching part 13 and the lens 12. It should be also understood by the ordinary person in the art that the matching part 13 can be dispensed with from the image projection source 10'. In this case, the polarizer 14 can be provided between the image source 11 and the lens 12 or downstream of the lens 12.

Figure 4B:
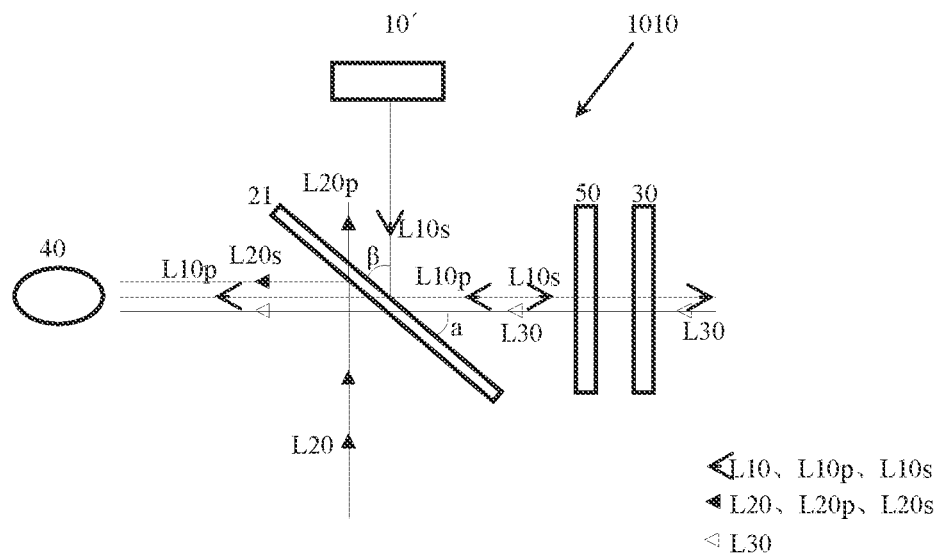
FIG. 4b schematically illustrates an optical system in which the image projection source of FIG. 4a is used.

FIG. 4b illustrates an optical system 1010 in which the image projection source 10' of FIG. 4a is adopted. In comparison with the optical system 1000, the optical system 1010 comprises the image projection source 10' in place of the image projection source 10 and the polarizer 60. According to the optical system 1010, since the light emitted from the image projection source 10' is the S-polarized light component L10s, this S-polarized light component L10s is incident on the polarizing beam splitter 21 and then reflected at the beam splitting side thereof towards the quarter-wave plate 50. In this way, no other polarized light component can be transmitted out of the transmission side of the polarizing beam splitter 21. Therefore, the possibility that the human eye 40 can see the image projection source 10 directly through the polarizing beam splitter 21 is eliminated or reduced.

Figure 5:
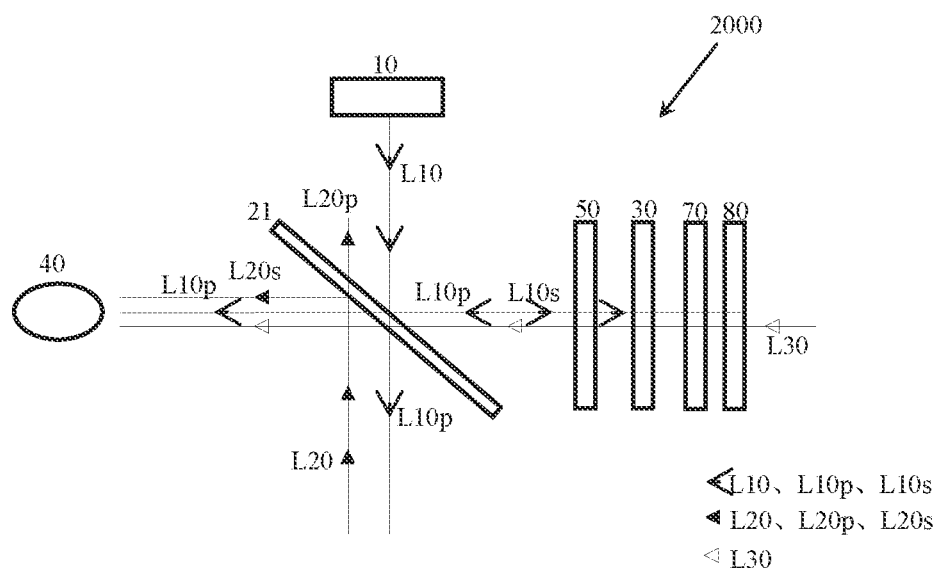
FIG. 5 is a view schematically illustrating an optical system for the AR apparatus according to another embodiment of the present application.

FIG. 5 schematically illustrates an optical system 2000 for the AR apparatus according to another embodiment of the present application. The optical system 2000 generally comprises an image projection source 10 controllable by a computer (not shown), a polarizing beam splitter 21 and a semi-reflector 30, wherein a quarter-wave plate 50 is arranged in an optical path between the polarizing beam splitter 21 and the semi-reflector 30. Settings of the image projection source 10, the polarizing beam splitter 21, the semi-reflector 30 and the quarter-wave plate 50 can refer to the previously described contents. Additionally, in an optical path of light L10 emitted from the image projection source 10 being reflected by a beam splitting side of the polarizing beam splitter, a second quarter-wave plate 70 and a polarizer 80 are arranged distal to the semi-reflector 30 of the optical system 2000 in this order. The polarizer 80 is located distal to the second quarter-wave plate 70. The quarter-wave plate 70 is configured to convert circularly polarized light into linearly-polarized light, whose polarization direction is the first or second direction, and the polarizer 80 is configured to absorb the linearly-polarized light. For instance, the quarter-wave plate 70 is configured to convert circularly polarized light into S-polarized light, and the polarizer 80 is configured to absorb the S-polarized light and allow P-polarized light to pass therethrough. For instance again, the quarter-wave plate 70 can be configured to convert circularly polarized light into P-polarized light, and the polarizer 80 is configured to absorb the P-polarized light and allow S-polarized light to pass therethrough. An extraordinary axis or an ordinary axis of the quarter-wave plate 70 is configured to include an angle with the polarization direction of the linearly-polarized light passing through the polarizer 80, which angle is between 30° and 60°. In a preferred embodiment, the extraordinary axis or the ordinary axis of the wave plate is configured to be at 45° relative to the polarization direction of the linearly-polarized light passing through the polarizer 80.

As shown by FIG. 5, when light emitted from the image projection source 10 passes through the polarizing beam splitter 21, a P-polarized light component L10p of the light L10 emitted from the image source is transmitted therethrough and an S-polarized light component L10s of the light L10 emitted from the image source is reflected towards the semi-reflector 30 or the quarter-wave plate 50. The S-polarized light component L10s is converted into circularly polarized light (or elliptically polarized light) by the quarter-wave plate 50. Subsequently, this circularly polarized light (or elliptically polarized light) is partially reflected by the semi-reflector 30 and partially transmitted through the same. The transmitted circularly polarized light can be converted into S-polarized light (or P-polarized light) by the quarter-wave plate 70, which light is then incident on and absorbed by the polarizer 80. This polarizer 80 is configured to absorb S-polarized light (or P-polarized light) and allow the P-polarized light (or the S-polarized light) to pass therethrough. Therefore, no light L10 emitted from the image source can substantially exit from the AR apparatus. In case of the elliptically polarized light, most of the light will be absorbed and thus prevented from exiting from the AR apparatus. Therefore, the privacy and interactivity of the AR apparatus can be greatly improved.

In an optional embodiment, the quarter wave 70 and the polarizer 80 can adhered together so as to decrease the number of reflective interfaces. Therefore, the energy utilization of light can be enhanced.

If the semi-reflector 30 is a curved semi-reflector, the contours of the wave plate 70 and the polarizer 80 in a lateral direction will substantially follow the curved shape of the semi-reflector. In the context of the specification, the lateral direction generally refers to the left-right direction of the user's body. Therefore, the negative effects of stray light and "ghost" can be reduced to improve the image quality. Optionally, the contours of the additional wave plate and the additional polarizer in a longitudinal direction substantially perpendicular to the lateral direction substantially follow the curved shape of the semi-reflector. In a preferred embodiment, the semi-reflector is a curved semi-reflector and the contours of the additional wave plate and the additional polarizer substantially follow the curved shape of the semi-reflector, so as to achieve the optimal results of reducing the negative effects of stray light and "ghost".

In an optional embodiment, the optical system also comprises a transparent protective sheet located distal to the additional polarizer. The wave plate 70 and the polarizer 80 are located between the semi-reflector 30 and the transparent protective sheet, such that the negative effect of "ghost" caused by ambient light entering the transparent protective sheet but being reflected by a distal surface of the semi-reflector 30 can be alleviated. If any light is leaky out of the polarizer 80 due to the optical element's performance, the negative effect of "ghost" caused by the light being reflected at the transparent protective sheet can be alleviated. The transparent protective sheet can be a light attenuation sheet, a photochromic sheet or an electrochromic sheet.

Figure 6A:
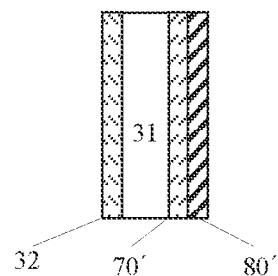
FIG. 6a is a cross-sectional view schematically illustrating a semi-reflector according to an embodiment of the present application.

FIG. 6a is a cross-sectional view illustrating a semi-reflector 30' according to an embodiment of the present application. The semi-reflector 30' comprises a transparent substrate 31 and a semi-reflective film 32 applied over a proximal surface of the transparent substrate 31. Furthermore, the semi-reflector 30' also comprises a quarter-retarder film 70' and a polarizing film 80', which are applied in this order relative to a distal surface of the substrate 31. The quarter-retarder film 70' and the polarizing film 80' can be configured in the same way as the quarter-wave plate 70 and the polarizer 80 respectively. In this way, because the semi-reflector 30' itself is integrated with the quarter-retarder film 70' and the polarizing film 80', the volume of the optical system is further reduced. In the meanwhile, the number of reflective interfaces can be reduced such that stray light of the whole optical system is decreased and the contrast of the optical system is improved.

Figure 6B:
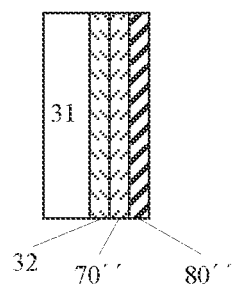
FIG. 6b is a cross-sectional view schematically illustrating a semi-reflector according to another embodiment of the present application.

Optionally, FIG. 6b is a cross-sectional view schematically illustrating a semi-reflector 30" according to another embodiment of the present application. The semi-reflector 30" comprises a transparent substrate 31 and a semi-reflective film 32 applied over a distal surface of the transparent substrate 31. Further, the semi-reflector 30' also comprises a quarter-retarder film 70" and a polarizing film 80" which are applied over the semi-reflective film 32 in this order. The quarter-retarder film 70" and the polarizing film 80" are configured similarly to the quarter-retarder film 70 and the polarizing film 80 respectively.

Figure 6C:
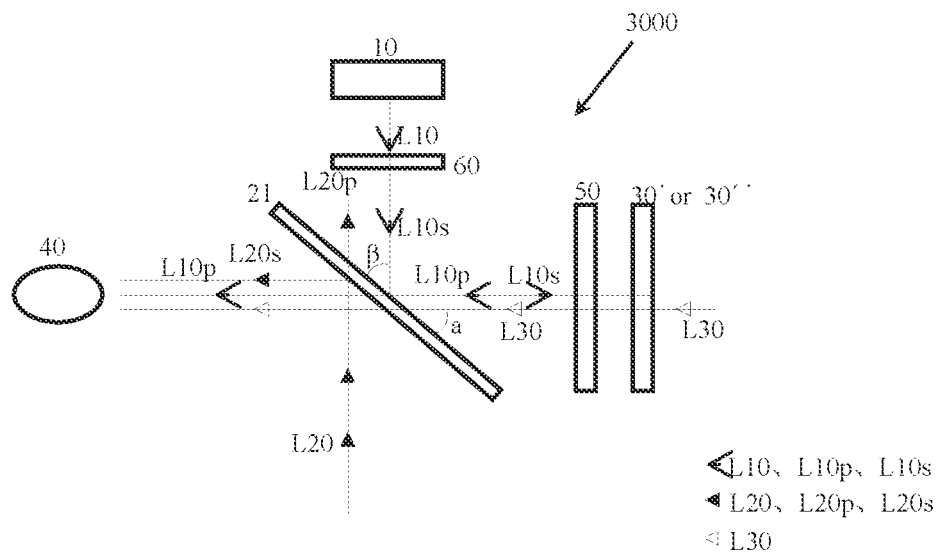
FIG. 6c is a view schematically illustrating an optical system for the AR apparatus in which the semi-reflector of FIG. 6a or 6b is used.

FIG. 6c is a view illustrating an optical system 3000 in which the semi-reflector of FIG. 6a or 6b is adopted. The optical system 3000 is configured similar to the optical system 1000 of FIG. 3 wherein the semi-reflector of the optical system 1000 is replaced by the semi-reflector 30' or 30". Therefore, optical elements of the optical system 3000 expect for the semi-reflector 30' or 30" can refer to the description of FIG. 3. In the optical system 3000, light L10 emitted from the image projection source 10 passes through the polarizer 60 and then is converted into an S-polarized light component L10s. When the S-polarized light component L10s is incident on the polarizing beam splitter 21, it is reflected by the beam splitting side of the splitter towards the quarter-wave plate 50 and is converted into circularly polarized light by the same. When the circularly polarized light is incident on the semi-reflector 30' or 30", the light component of the circularly polarized light which passes through the semi-reflective film 32 or is not reflected directly by the semi-reflective film 32 can be converted into linearly-polarized light and then be absorbed according to the principle of FIG. 5. Therefore, the light emitted from the image projection source 10 can be prevented from exiting from the AR apparatus. In this way, the privacy of the AR apparatus and the interactivity of the user can be improved.

In an alternative embodiment, the substrate 31 of the semi-reflector 30' can be formed similar to the quarter-wave plate 70 and thus the quarter-retarder film 70' can be dispensed with.

Furthermore, it should be understood by the ordinary person in the art that the semi-reflector of the present application can be curved, for instance partly-cylindrical or partly-spherical; or alternatively can be partly rotational-symmetric (non-spherical) or other suitable or freely curved. For instance again, in order not to affect the comfort of a user wearing the apparatus and watching the real scene, the inventive semi-reflector's whole diopter is between ±150 degrees, preferably ±100 degrees.

In a preferred embodiment, the semi-reflector 400 can comprise an anti-reflective film applied over the proximal surface thereof, so as to improve the energy utilization efficiency of light.

It should be understood by the ordinary person in the art, after reading the description of the present application, that although the quarter-wave plate or film has been described here, the plate or film can be replaced in the present application by any other wave plate or retarder film or optical element, which can enable an additional optical path difference to be generated between two lights polarized perpendicular to each other, as long as the other wave plate or retarder film or optical element can achieve or substantially achieve similar functions as in those already mentioned technical solutions of the present application.

The image projection source mainly comprises an image source and a beam shaping element.

According to the present application, the image projection source of the image source can be any suitable form of image source. In some embodiments, the image source can be a monochromatic or polychromatic light source. In some embodiments, the image source can be a laser source or a LED source, such as a LED display. In some embodiments, the image source can be a planar image source such as a planar display or alternatively a curved image source such as a curved display. In some embodiments, the image source can be an integrated light source or a single light source. Examples of the image source comprise but are not limited to OLED (Organic Light Emitting Diodes), LCOS (Liquid Crystal On Silicon), LCD (liquid crystal display), MEMS (Micro-Electromechanical Systems) and DMD (Digital Mirror Device).

The beam shaping element of the image projection source is disposed in an optical path of light emitted from a source of the image source, so as to collimate, shape and/or combine light beams emitted from the image source.

According to the present application, the beam shaping element can be configured as a lens. The lens of the beam shaping element according to the present application can be one lens or a lens subassembly comprised of lenses. The lens or each lens of the lens subassembly can be a convex lens, a concave lens, or a combination of the convex and concave lenses. The lens's surface can have a spherical surface, aspherical surface or freeform surface.

According to the present application's principles, the beam shaping element can be integrated into the image source by directly face-to-face adhesion for example through an adhesive, or alternatively integrated into the image source through an intermediate matching part. In other words, the image source and the beam shaping element of the image projection source of the AR apparatus according to the present application are directly integrated together or indirectly integrated together through the intermediate matching part, as an integral piece. The intermediate matching part is formed by such a matching medium which is not air and whose refractive index is greater than 1. In this way, light beams VL emitted from the image source and carrying virtual image information can enter the beam shaping element directly or through the matching medium whose refractive index is greater than 1. Thereafter, they radiate from the image projection source through the beam shaping element.

Preferably, the refractive index of the matching medium for forming the intermediate matching part can be 1~2.7. The matching medium for forming the intermediate matching part can be a liquid medium, a liquid crystal medium, a semi-solid medium or a solid medium. The intermediate matching part can be formed by at least one of the mentioned mediums. The liquid medium can be a transparent medium such as water or ethyl alcohol. The solid medium can be a transparent solid medium such as glass or resin.

Figure 7:
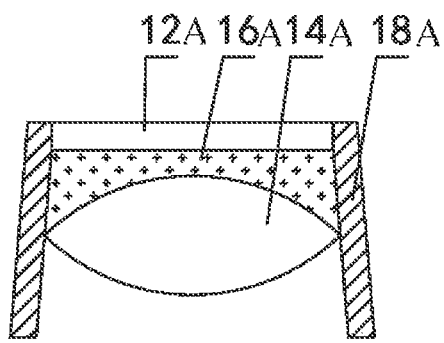
FIG. 7 is a cross-sectional view schematically illustrating an image projection source for the AR apparatus according to an embodiment of the present application.

FIG. 7 illustrates an example of the image projection source of the AR apparatus according to the present application. In this example, an image source 12A and a beam shaping element 14A are indirectly integrated together by an intermediate matching part 16. In this example, the beam shaping element 14A is provided as a lens, and the intermediate matching part 16 is formed by a liquid and/or liquid crystal medium. Consequently, the image projection source 10 comprises a seal structure by which the liquid or liquid medium can be sealed between the image source 12A and the beam shaping element 14A. It is understood that the seal structure can be any suitable seal structure known in the art.

In a feasible embodiment, the seal structure comprises a seal frame 18A. The seal frame 18A is adhered to the image source 12A to achieve seal therebetween. Seal between the seal frame 18 and the lens of the beam shaping element 14A can be achieved by inlay engagement therebetween. Optionally, depending on the form of medium used to form the intermediate matching part 16A, the seal frame 18A can be adhered to the lens of the beam shaping element 14A.

According to such a configuration, light beams emitted from the image source 12A and carrying virtual image can enter first the intermediate matching part 16 A and then the beam shaping element 14A which is in the form of a lens. As the refractive index of the matching medium is greater than that of air, the refractive index's difference between the medium, by which the lens of the beam shaping element 14 A is formed, and the matching medium is less than the refractive index's difference between the medium, by which the lens of the beam shaping element 14 A is formed, and air at an interface between the intermediate matching part 16 and the beam shaping element 14A. Therefore, much more light beams can be refracted such that light transmittance can be improved and the image projection source's optical efficiency can be increased. Consequently, less light beams can be reflected at the interface such that occurring of stray light and ghost image can be restrained or reduced.

It is observed from an equation $R=(0.61*\lambda)/(n*\sin\theta)$, wherein R is the radius of an Airy disc, $\lambda$ is the wavelength of the light, n is the refractive index in image space and $\theta$ is the incidence aperture angle, that as the refractive index of the matching medium becomes greater, the produced Airy disc will become smaller and thus the imaging resolution can be increased. Furthermore, because the refractive index becomes greater at the imaging side, a great numerical aperture can be obtained with a relatively smaller aperture angle and the bending angle of marginal light beams can be reduced, which results in less design difficulty. Moreover, since the image source is integrated together with the beam shaping element, the optical structure is more compact and more easily installed and adjusted, and thus is more systemic.

Figure 8:
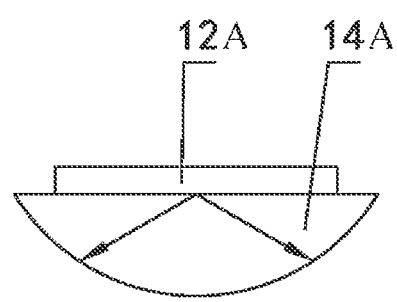
FIG. 8 is a cross-sectional view schematically illustrating an image projection source for the AR apparatus according to another embodiment of the present application.

FIG. 8 illustrates another example of the image projection source of the AR apparatus according to the present application. In this example, an image source 12A and a beam shaping element 14A are integrated together in a manner of face-fitting. The image source 12A and the beam shaping element 14A have complementary contact sides which can be fitted onto each other. As one example, a lens, by which the beam shaping element 14A is formed, is adhered to the image source 12A. Alternatively, the image source 12A and the beam shaping element 14A can be firmly fitted onto each other via any other suitable manner known by the ordinary person in the art.

According to such a configuration, source light beams emitted from the image source 12A directly enter the lens forming the beam shaping element 14A. Such a configuration can provide all benefits as those described with respect to FIG. 7. Additionally, in such a configuration, the image source is directly fitted onto the lens such that the optical structure can be more compact, smaller, and lighter and is more comfortable to be worn. The more compact structure ensures that it is easy to be installed and adjusted.

Some preferred examples of the image projection source according to the present application have been explained with respect to FIGS. 7 and 8. It should be understood by the ordinary person in the art that those are not all of examples of the image projection source according to the present application. According to the present application, such an embodiment, in which the image source is integrated together with the beam shaping element, is also feasible. It should be understood by the ordinary person in the art that according to the present application the image projection source can be used in combination with a light path module no matter how which is comprised of and no matter what kind of function which has. The light path module used in combination with the image projection source according to the present application can comprise any number of optical elements, optical elements having any functions or any combination of optical elements feasibly arranged.

According to an optional embodiment of the present application, the image projection source comprises an image source and a beam shaping element integrated with each other as a unitary piece, in which light beams emitted from the image projection source are shaped by the beam shaping element to exit from the image source. Optionally, the beam shaping element is directly integrated into the image source. For instance, the beam shaping element is adhered to the image source in a manner of face-fitting. Optionally, the beam shaping element can be indirectly integrated into the image source via an intermediate matching part. Optionally, the intermediate matching part is formed by at least one selected from a group comprised of a liquid medium, a liquid crystal medium, a semi-solid medium and a solid medium.

Optionally, the intermediate matching part is formed by any one selected from a group comprised of water, ethyl alcohol, glass and resin.

Optionally, the intermediate matching part is formed by a liquid medium and/or a liquid crystal medium, and the image projection source also comprises a seal structure by which the medium forming the intermediate matching part is sealed between the image source and the beam shaping element.

Optionally, the medium of the intermediate matching part has a refractive index of 1~2.7.

Optionally, the beam shaping element is configured as a positive lens or configured as a negative lens or configured as a combination of positive and negative lenses.

Figure 9:
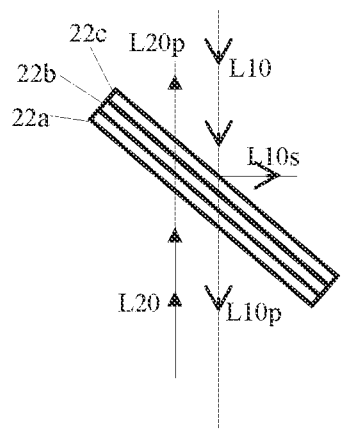
FIG. 9 is an enlarged view schematically illustrating a splitter according to an embodiment of the present application.

FIG. 9 is an enlarged view illustrating a splitter 22 according to an embodiment of the present application. The splitter is a three-layer structure, comprising a splitter substrate 22a, a polarizing film 22b and a polarizing beam splitting film 22c in this order. The splitter substrate 22a can be a light splitter well-known in the art, for example a non-polarizing beam splitter. The polarizing film 22b is a film allowing polarized light, whose polarization is in a first direction, to pass therethrough but absorbing polarized light whose polarization is in a second direction perpendicular to the first direction. The polarizing beam splitting film 22c is a film allowing the polarized light, whose polarization is in the first direction, to be transmitted therethrough and the polarized light, whose polarization is in the second direction, to be reflected.

In an alternative embodiment where the splitter 21 of FIG. 2 is replaced by the splitter 22, when light L10 emitted from the image projection source is incident on the polarizing beam splitting film 22c (the beam splitting side) of the splitter 22, the P-polarized light component L10p of the light L10 emitted from the image source is transmitted through the polarizing beam splitting film 22c and further through the polarizing film 22b to exit from a transmission side of the splitter 22. The S-polarized light component L10s of the light L10 emitted from the image source is reflected towards the quarter-wave plate. When passing through the quarter-wave plate, the S-polarized light component L10s is converted into circularly polarized light. When arriving in the semi-reflector 30, the circularly polarized light is partially transmitted therethrough and is partially reflected thereby. The reflected circularly polarized light passes through the quarter-wave plate again and then is converted into a P-polarized light component L10p. Subsequently, the P-polarized light component L10p is incident on the polarizing beam splitting film 22c (the beam splitting side) of the splitter 22, and passes through the same and the polarizing film 22b to be seen by the human eye 40. In the meanwhile, ambient light L30 passes through the semi-reflector 30 and the quarter-wave plate in this order and partially through the splitter assembly 22 to be seen by the human eye 40. Furthermore, when unwanted light L20 is incident on the splitter substrate 22a (the transmission side) of the splitter 22, an S-polarized light component of the unwanted light is absorbed by the polarizing film 22b and a P-polarized light component of the unwanted light passes through the polarizing film 22b and subsequently through the polarizing beam splitting film 22c. Therefore, in the case that the splitter of the already mentioned optical system is replaced by the splitter 22, ideally, no light component of the unwanted light L20 can transmit towards the human eye 40 such that influence of the unwanted light on the user's observation is completely eliminated or weakened, and thus the whole optical system's image quality is improved.

In an alternative embodiment, positions of the splitter substrate 22a and the polarizing film 22b are interchangeable. Even in an alternative embodiment, the splitter substrate 22a can be dispensed with.

In practical production, because the splitter substrate or the film itself has a thickness, not all of the light L10 emitted from the image source, upon being incident on the splitter assembly 22, can be modulated by the polarizing film 22b and the polarizing beam splitting film 22c. That is to say, there is a possibility that a very small portion of the component of the light L10 emitted from the image source may be transmitted onto the transmission side of the splitter assembly 22. Due to interface of the transmission side with air, this very small portion of the component of the light L10 emitted from the image source may be reflected towards the polarizing film 22b and the polarizing beam splitting film 22c. Finally, this very small portion of the component of the light L10 emitted from the image source may result in "interference of ghost" in imaging of the whole optical system, which thus affects the image quality that can be seen by the human eye 40.

Figure 10:
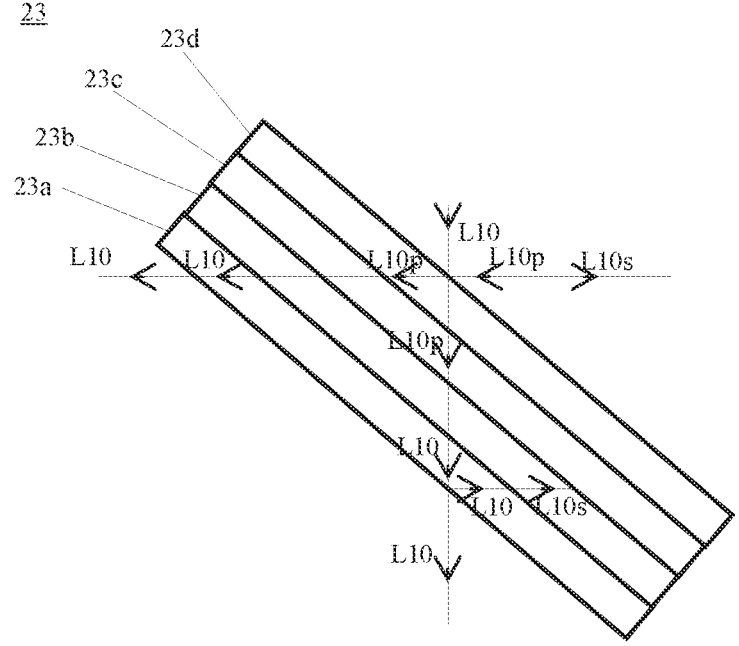
FIG. 10 is an enlarged view schematically illustrating a splitter according to another embodiment of the present application.

FIG. 10 is an enlarged view illustrating a splitter 23 according to another embodiment of the present application. The splitter 23 is a four-layer structure, comprising a splitter substrate 23a, a quarter-retarder film 23b, a polarizing film 23c and a polarizing beam splitting film 23d in this order. For example, they are sequentially adhered together as a unitary piece. The polarizing beam splitting film 23d defines a beam splitting side of the splitter 23, and the splitter substrate 23a defines a transmission side of the splitter 23. In the splitter 23, the beam splitting side and the transmission side are separated by the quarter-retarder film 23b and the polarizing film 23c.

Further, as shown by FIG. 10, when light L10 emitted from the image projection source 100 is incident on the polarizing beam splitting film 23d (the beam splitting side) of the splitter 23, a P-polarized light component L10p of the light L10 emitted from the image source is converted by the quarter-retarder film 23b into circularly polarized light. When the circularly polarized light propagates in the splitter substrate 23a to an interface with air (the transmission side), a small portion of the circularly polarized light will be reflected at the interface towards the quarter-retarder film 23b within the splitter substrate 23a because the medium parameters of the air and the substrate are obviously different than each other at the interface. When passing through the quarter-retarder film 23b again, the reflected circularly polarized light will be converted into an S-polarized light component since its polarization direction is changed by 90°. Subsequently, the S-polarized light component is absorbed by the adjacent polarizing film 23c. Therefore, "interference of ghost" can be reduced or eliminated. In the embodiment shown by FIG. 10, from the transmission side to the beam splitting side of the splitter 23, the splitter substrate 23a, the quarter-retarder film 23b, the polarizing film 23c and the polarizing beam splitting film 23d are arranged in this order. In an alternative embodiment, from the transmission side to the beam splitting side of the splitter 23, the quarter-retarder film, the splitter substrate, the polarizing film and the polarizing beam splitting film can be re-arranged in this order. In an alternative embodiment, from the transmission side to the beam splitting side of the splitter 23, the quarter-retarder film, the polarizing film, the splitter substrate and the polarizing beam splitting film can be re-arranged in this order. In an alternative embodiment, from the transmission side to the beam splitting side of the splitter 23, the quarter-retarder film, the polarizing film, the polarizing beam splitting film and the splitter substrate can be re-arranged in this order. In an alternative embodiment, the splitter substrate can be even dispensed with.

According to an optional embodiment of the present application, an optical system for an augmented reality (AR) apparatus is provided, comprising:

an image projection source;
a splitter having a beam splitting side adjacent to the image projection source and a transmission side facing away from the image projection source;
a wave plate adjacent to the beam splitting side, and the splitter being arranged in such a way that light emitted from the image projection source is able to be non-perpendicularly incident on the beam splitting side and at least partially reflected towards the wave plate; and
a semi-reflector located downstream of the wave plate in a reflected light path,
wherein the splitter is configured such that when the light emitted from the image projection source is incident on the beam splitting side, a polarized light component, whose polarization is in a first direction, passes through the splitter to be transmitted through the transmission side, and a polarized light component, whose polarization is in a second direction perpendicular to the first direction, is reflected by the beam splitting side towards the wave plate; and the splitter is also configured in such a way that when light is incident on the transmission side, a polarized light component, whose polarization is in the first direction, of the light is able to pass through the splitter to be transmitted from the beam splitting side, and a polarized light component, whose polarization is in the second direction, of the light is able to be absorbed in the splitter. Preferably, the wave plate is a quarter-wave plate. Therefore, the energy of the light, emitted from the image source, entering the human eye can be increased, and except for ambient light, unwanted light entering the human eye can be blocked or reduced, such that the image quality and sharpness can be improved and the power consumption of the AR apparatus can be reduced.

Optionally, the splitter comprises a polarizing beam splitting film and a polarizing film, wherein the polarizing beam splitting film is configured in such a way that light polarized in the first direction is allowed to pass therethrough and light polarized in the second direction is reflected thereby, wherein the polarizing film is configured in such a way that light polarized in the first direction is allowed to pass therethrough and light polarized in the second direction is absorbed therein, and wherein viewed in a direction of the light emitted from the image projection source, the polarizing beam splitting film is located upstream of the polarizing film to define the beam splitting side. In this way, the polarized light component whose polarization is in the second direction is ensured to be inevitably reflected by the polarizing beam splitting film so as to subsequently be processed by the wave plate or quarter-wave plate and the semi-reflector and then enter the human eye for imaging.

Optionally, the transmission side is defined by the polarizing film so as to increase the energy utilization efficiency of light.

Optionally, the splitter also comprises a splitter substrate located between the polarizing beam splitting film and the polarizing film so as to improve the integral strength of the splitter.

Optionally, the splitter also comprises a splitter substrate, wherein the polarizing film is located between the splitter substrate and the polarizing beam splitting film, and wherein the transmission side is defined by the splitter substrate so as to improve the integral strength of the splitter.

Optionally, the splitter also comprises a splitter substrate, wherein the polarizing beam splitting film is located between the splitter substrate and the polarizing film, and wherein the transmission side is defined by the polarizing film so as to improve the integral strength of the splitter.

Optionally, the splitter also comprises a retarder film, wherein the polarizing film is located between the retarder film and the polarizing beam splitting film so as to eliminate the "interference of ghost" effect and improve the energy utilization efficiency of light. Preferably, the retarder film is a quarter-retarder film.

Optionally, the beam splitting side is defined by the polarizing beam splitting film, and the transmission side is defined by the retarder film so as to eliminate the "interference of ghost" effect and improve the energy utilization efficiency of light.

Optionally, the splitter also comprises a splitter substrate, wherein the retarder film and the polarizing film are located between the splitter substrate and the polarizing beam splitting film, and the transmission film is defined by the splitter substrate so as to eliminate the "interference of ghost" effect and improve the integral strength of the splitter structure.

Optionally, the splitter also comprises a splitter substrate, wherein the splitter substrate and the polarizing film are located between the retarder film and the polarizing beam splitting film, and the transmission side is defined by the retarder film so as to eliminate the "interference of ghost" effect and improve the integral strength of the splitter structure.

Optionally, the splitter also comprises a splitter substrate, wherein the polarizing beam splitting film is between the polarizing film and the splitter substrate so as to eliminate the "interference of ghost" effect and improve the integral strength of the splitter structure.

Optionally, the image projection source comprises a planar image source for emitting light, wherein the plane where the beam splitting side of the splitter locates is at a first angle relative to the normal of the image source, which first angle has a value of between 11° and 79°, preferably between 20° and 70°, more preferably between 30° and 60°, more preferably between 40° and 55°, most preferably between 40° and 50°; and/or wherein the plane where the beam splitting side of the splitter locates is at a second angle relative to an optical axis of the semi-reflector, wherein 0<the second angle<90° and the second angle is between the first angle−10° and the first angle+10°.

Optionally, the wave plate is integrated together with the semi-reflector so as to reduce the volume of the entire system. Moreover, the integration can reduce the number of reflective interfaces, such that stray light occurring in the whole optical system can be reduced or the effect of "interference of ghost" can be weakened, so as to increase the optical system's contrast.

Figure 11:
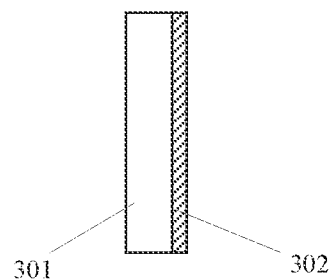
FIG. 11 is a cross-sectional view schematically illustrating a semi-reflector according to an embodiment of the present application.

FIG. 11 is a cross-sectional view schematically illustrating a semi-reflector 300A according to an embodiment of the present application. The semi-reflector 300A can be alternatively used in the optical systems according to the present application, and comprises a transparent substrate 301 and a semi-reflective film 302 applied over a distal surface of the transparent substrate 301.

For a conventional semi-reflector, the semi-reflective film is usually applied over a proximal surface of the substrate. Therefore, for the illustrated optical systems, the light or its component, emitted from the image source, entering the human eye 40 may mainly undergo one reflection. However, for the semi-reflector 300A as illustrated by FIG. 11, the light or its component, emitted from the image source, entering the human eye 40 can undergo at least two refractions and one reflection. Therefore, according to the inventive technical means, the whole optical system can be designed more flexibly. For example, designers can redesign the refraction of light by varying the thickness or material property of the substrate 301 and reforming the proximal surface's morphology of the substrate 301, so as to change the optical performance of the whole optical system. Furthermore, because propagation of light in the substrate 301 relates to reflection and refraction, light at the final refraction will result in an effect of field-of-view enlargement, which facilitates final imaging results in the human eye.

Figure 12:
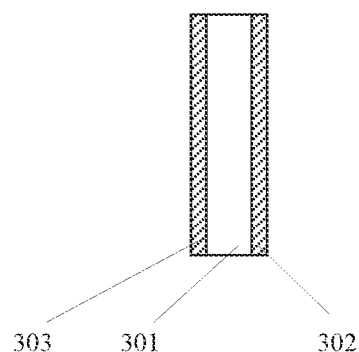
FIG. 12 is a cross-sectional view schematically illustrating a semi-reflector according to another embodiment of the present application.

FIG. 12 schematically illustrates a semi-reflector 310 according to anther embodiment of the present application. Similar to the semi-reflector 300A, the semi-reflector 310 comprises a transparent substrate 301 and a semi-reflective film 302 applied over a distal surface of the transparent substrate 301. Furthermore, the semi-reflector 310 also comprises an anti-reflective film 303 applied over a proximal surface of the transparent substrate 301. The anti-reflective film is used to increase the energy of light entering the substrate so as to improve the energy utilization efficiency of light which is modulated via refraction and reflection.

Figure 13:
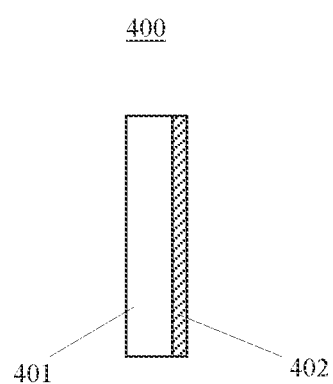
FIG. 13 is a cross-sectional view schematically illustrating a semi-reflector according to another embodiment of the present application.

FIG. 13 schematically illustrates a semi-reflector 400 according to another embodiment of the present application. The semi-reflector 400 comprises a quarter-wave plate 401 and a semi-reflective film 402 applied over a distal surface of the quarter-wave plate 401. That is to say, in this embodiment, the quarter-wave plate 401 is a substrate of the semi-reflector 400. For example, the quarter-wave plate 401 can be made of a certain birefringent material such as an optical plastic material, an optical glass, an optical crystal or the like.

According to an aspect of the present application, an optical system of an augmented reality (AR) apparatus is provided, comprising:

an image projection source;
a splitter, the splitter having a beam splitting side adjacent to the image projection source and a transmission side facing away from the image projection source; and
a semi-reflector, the semi-reflector being arranged adjacent to the beam splitting side and being downstream of the beam splitting side in an optical path along which light emitted from the image projection source is reflected by the beam splitting side, the splitter being arranged such that the light emitted from the image projection source is able to be at least partially reflected by the beam splitting side towards the semi-reflector, wherein the semi-reflector comprises a substrate and a semi-reflective film on a distal surface of the substrate.

Because the semi-reflective film is on the distal surface of the semi-reflector's substrate, the light emitted from the image source undergoes two refractions and one reflection at the semi-reflector before it enters the human eye for imaging. In this way, the design freedom of the whole optical system can be enhanced. The number of adjustable parameters for enhancing the design freedom of the whole optical system can be increased. In the meanwhile, the field of view can be enlarged, which facilitates the final imaging result in the human eye.

Optionally, a wave plate is arranged between the splitter and the semi-reflector, and preferably the wave plate is a quarter-wave plate. The wave plate or quarter-wave plate is used to improve the imaging's brightness and contrast, so as to reduce the apparatus's power consumption.

Optionally, the substrate of the semi-reflector is a wave plate, and preferably the wave plate is a quarter-wave plate. Integration of the wave or quarter-wave plate in the semi-reflector reduces the semi-reflector's volume, such that the mechanical structure of the whole optical system can be more flexibly designed. Furthermore, the integration can reduce the number of reflective interfaces, such that stray light of the whole optical system can be reduced and the effect of "ghost" can be eliminated to improve the contrast of the optical system.

Optionally, an anti-reflective film is applied over a proximal surface of the substrate. The anti-reflective film is used to increase the energy of light entering the substrate and thus improve the energy utilization efficiency in modulating light by refraction and reflection.

Optionally, the splitter is configured in such a way that when the light emitted from the image projection source is incident on the beam splitting side, a polarized light component, whose polarization is in a first direction, passes through the splitter to be transmitted through the transmission side, and a polarized light component, whose polarization is in a second direction perpendicular to the first direction, is reflected by the beam splitting side towards the wave plate, and wherein the splitter is also configured in such a way that when light is incident on the transmission side, a polarized light component, whose polarization is in the first direction, of the light is able to pass through the splitter to be transmitted from the beam splitting side, and a polarized light component, whose polarization is in the second direction, of the light is able to be absorbed in the splitter. In this way, unwanted light except for ambient light can be prevented from entering the human eye, such that the image quality and sharpness can be improved. The energy consumption of the AR apparatus can be reduced.

Optionally, the splitter comprises a polarizing beam splitting film and a polarizing film, wherein the polarizing beam splitting film is configured to allow polarized light, whose polarization is in the first direction, to be transmitted and polarized light, whose polarization is in the second direction to be reflected, wherein the polarizing film is configured to allow polarized light, whose polarization is in the first direction, to be transmitted and polarized light, whose polarization is in the second direction, to be absorbed, and wherein viewed in a direction of the light emitted from the image projection source, the polarizing beam splitting film is located upstream of the polarizing film to define the beam splitting side. In this way, the polarized light component whose polarization is in the second direction is ensured to be inevitably reflected by the polarizing beam splitting film to subsequently be processed through the wave or quarter-wave plate and the semi-reflector and finally enter the human eye for imaging. Optionally, an extraordinary axis and an ordinary axis of the wave plate are configured to include an angle with the first and second directions respectively, which angle is between 1° and 89°, preferably between 30° and 60°, more preferably 45°.

Optionally, the image projection source comprises a planar image source for emitting light, wherein the plane where the beam splitting side of the splitter locates is at a first angle relative to the normal of the image source, which first angle has a value of between 11° and 79°, preferably between 20° and 70°, more preferably between 30° and 60°, more preferably between 40° and 55°, most preferably between 40° and 50°; and/or wherein the plane where the beam splitting side of the splitter locates is at a second angle relative to an optical axis of the semi-reflector, wherein 0<the second angle<90° and the second angle is between the first angle−10° and the first angle+10°. In this way, the utilization efficiency of the splitter can be maximized.

Optionally, the semi-reflector is a curved semi-reflector.

Optionally, the semi-reflector has a refractive power of between ±150 degrees, preferably ±100 degrees. In this way, it can ensure that the comfort of a user who uses the apparatus is not affected.

According to another aspect of the present application, a semi-reflector for the above-mentioned optical system is provided, wherein the semi-reflector comprises a substrate and a semi-reflective film located on a distal surface of the substrate. In this way, the whole optical system can be more flexibly designed. The number of adjustable parameters for enhancing the design freedom of the whole optical system can be increased. In the meanwhile, the field of view can be enlarged, which facilitates the final imaging result in the human eye.

Optionally, the substrate of the semi-reflector is a wave plate, and preferably the wave plate is a quarter-wave plate, so as to improve the imaging's brightness and contrast, further to reduce the apparatus's power consumption.

Optionally, an anti-reflective film is applied over a proximal surface of the substrate, so as to increase the energy of light entering the substrate and thus improve the energy utilization efficiency in modulating light by refraction and reflection.

Optionally, the semi-reflector is a curved semi-reflector.

Optionally, the semi-reflector has a refractive power of between ±150 degrees, preferably ±100 degrees.

In the context of the present application, various embodiments can be arbitrarily combined with each other. Although some concrete embodiments of the present application have been described here, they are given for explanatory purposes only and cannot be deemed to constrain the scope of the present application in any way. Without facing away from the spirit and scope of the present application, various replacements, modifications and alternations can be contemplated.

The invention claimed is:

1. An optical system for an AR apparatus, comprising:
an image projection source;
a polarizing beam splitter having a beam-splitting side adjacent to the image projection source and a transmission side facing away from the image projection source, the polarizing beam splitter being arranged such that light emitted from the image projection source is able to be non-perpendicularly incident on and be at least partially reflected by the beam-splitting side, and the polarizing beam splitter being configured such that when light is incident on the beam-splitting side, a polarized light component, whose polarization is in a first direction, passes through the polarizing beam splitter and is transmitted through the transmission side thereof, and a polarized light component, whose polarization is in a second direction perpendicular to the first direction, is reflected from the beam-splitting side;
a polarizer disposed between the image projection source and the beam-splitting side of the polarizing beam splitter, and the polarizer is configured to allow polarized light, whose polarization is in the second direction, to be transmitted therethrough and polarized light, whose polarization is in the first direction to be absorbed;
a wave plate adjacent to the beam-splitting side, the light emitted from the image projection source being able to be at least partially reflected by the beam-splitting side towards the wave plate;
a semi-reflector located downstream of the wave plate in an optical path of reflected light; and
an additional wave plate and an additional polarizer which are located in this order distal to the semi-reflector, wherein the additional wave plate is configured such that when circularly polarized light is incident on it, linearly polarized light is able to exit, and the additional polarizer is configured to absorb the exiting linearly polarized light;
wherein the additional wave plate is in one of configurations including:
when the circularly polarized light is incident on it, a polarized light component, whose polarization is in the first direction, is able to exit, and wherein the additional polarizer is configured to absorb the polarized light component whose polarization is in the first direction, and
when the circularly polarized light is incident on it, a polarized light component, whose polarization is in the second direction, is able to exit, and wherein the additional polarizer is configured to absorb the polarized light component whose polarization is in the second direction,
wherein the additional wave plate and the additional polarizer are adhered together, and
wherein the semi-reflector is a curved semi-reflector, and the additional wave plate and the additional polarizer are in one of configurations including:
contours of the additional wave plate and the additional polarizer in a lateral direction substantially follow a curved shape of the semi-reflector,
contours of the additional wave plate and the additional polarizer in a longitudinal direction substantially perpendicular to the lateral direction substantially follow a curved shape of the semi-reflector, and
contours of the additional wave plate and the additional polarizer substantially follow a curved shape of the semi-reflector.

2. The optical system as recited in claim 1, wherein the polarizer is integrated in the image projection source such that polarized light, whose polarization is in the second direction, is emitted from the image projection source.

3. The optical system as recited in claim 1, wherein the image projection source comprises an image source which is controlled to emit light, and a lens for focusing the emitting light, and wherein the polarizer is located between the image source and the lens.

4. The optical system as recited in claim 3, wherein the polarizer is adhered to one of the image source and the lens.

5. The optical system as recited in claim 3, wherein the image source, the polarizer and the lens are adhered together.

6. The optical system as recited in claim 3, wherein the lens is one of a convex lens, a concave lens, and a combination of a convex and a concave lenses.

7. The optical system as recited in claim 1, wherein the optical system also comprises a transparent protective sheet located distal to the additional polarizer.

8. The optical system as recited in claim 7, wherein the additional wave plate and the additional polarizer are located between the semi-reflector and the transparent protective sheet.

9. The optical system as recited in claim 7, wherein the transparent protective sheet is one of a light attenuation sheet, a photochromic sheet, and an electrochromic sheet.

10. The optical system as recited in claim 1, wherein the wave plate is a quarter-wave plate applied over a proximal surface of the semi-reflector.

11. The optical system as recited in claim 1, wherein the wave plate is integrated together with the semi-reflector.

12. The optical system as recited in claim 1, wherein the semi-reflector comprises a transparent substrate and a semi-reflective film applied over a surface of the substrate.

13. The optical system as recited in claim 1, wherein the additional wave plate is a quarter-wave plate, an extraordinary axis or an ordinary axis of the quarter-wave plate is configured to include an angle with a polarization direction of a linearly-polarized light passing through the additional polarizer, which angle is between 30° and 60°.

14. The optical system as recited in claim 13, wherein the extraordinary axis or the ordinary axis of the quarter-wave plate is configured to be at 45° relative to the polarization direction of the linearly-polarized light passing through the additional polarizer.

15. The optical system as recited in claim 1, wherein the image projection source comprises a planar image source for emitting light, wherein a plane where the beam-splitting side of the polarizing beam splitter locates is at a first angle ($\beta$) relative to a normal of the image source, which first angle has a value between 11° and 79°; and/or, wherein a plane where the beam-splitting side of the polarizing beam splitter locates is at a second angle ($\alpha$) relative to an optical axis of the semi-reflector, in which 0<the second angle ($\alpha$)<90°) and the first angle ($\beta$)−10°≤the second angle ($\alpha$)≤the first angle ($\beta$)+10°.

16. The optical system as recited in claim 1, wherein the polarizing beam splitter comprises a splitter substrate, a polarizing film, and a polarizing beam splitting film in this order.

17. An optical system for an AR apparatus, comprising:
a image source controlled to emit light;
a lens for focusing emitting light;
a polarizer located between the image source and the lens;
a polarizing beam splitter having a beam-splitting side adjacent to the image source and a transmission side facing away from the image source;
a wave plate adjacent to the beam-splitting side, the light emitted from the image source being able to be at least partially reflected by the beam-splitting side towards the wave plate;
a semi-reflector located downstream of the wave plate in an optical path of reflected light; and
an additional wave plate and an additional polarizer which are located in this order distal to the semi-reflector;
wherein the additional wave plate and the additional polarizer are adhered together, and
wherein the semi-reflector is a curved semi-reflector, and the additional wave plate and the additional polarizer are in one of configurations including:
contours of the additional wave plate and the additional polarizer in a lateral direction substantially follow a curved shape of the semi-reflector,
contours of the additional wave plate and the additional polarizer in a longitudinal direction substantially perpendicular to the lateral direction substantially follow a curved shape of the semi-reflector, and
contours of the additional wave plate and the additional polarizer substantially follow a curved shape of the semi-reflector.

18. The optical system as recited in claim 17, wherein the optical system also comprises a transparent protective sheet located distal to the additional polarizer.

19. A head-mounted augmented reality apparatus, comprising:
a bracket; and
an optical system integrated in the bracket and comprising:
an image source controlled to emit light;
a lens for focusing emitting light;
a polarizer located between the image source and the lens;
a polarizing beam splitter having a first side adjacent to the image source and a second side facing away from the image source;
a semi-reflector located at a side of the polarizing beam splitter;
a wave plate arranged between the polarizing beam splitter and the semi-reflector;
an additional wave plate and an additional polarizer which are located in this order distal to the semi-reflector;
wherein the additional wave plate and the additional polarizer are adhered together, and
wherein the semi-reflector is a curved semi-reflector, and the additional wave plate and the additional polarizer are in one of configurations including:
contours of the additional wave plate and the additional polarizer in a lateral direction substantially follow a curved shape of the semi-reflector,
contours of the additional wave plate and the additional polarizer in a longitudinal direction substantially perpendicular to the lateral direction substantially follow a curved shape of the semi-reflector, and
contours of the additional wave plate and the additional polarizer substantially follow a curved shape of the semi-reflector.

20. The optical system as recited in claim 19, wherein the image source, the polarizer and the lens are adhered together.

* * * * *